(12) United States Patent
Martins et al.

(10) Patent No.: US 7,066,291 B2
(45) Date of Patent: Jun. 27, 2006

(54) ROBOT SYSTEM

(75) Inventors: Gösta Martins, Västerås (SE); Mats Hallgren, Västerås (SE); Giovanni C. Pettinaro, Cassarate (CH); Jörgen Bergmark, Örebro (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/433,434

(22) PCT Filed: Dec. 4, 2001

(86) PCT No.: PCT/SE01/02671

§ 371 (c)(1),
(2), (4) Date: Nov. 10, 2003

(87) PCT Pub. No.: WO02/45915

PCT Pub. Date: Jun. 13, 2002

(65) Prior Publication Data

US 2004/0093650 A1 May 13, 2004

(30) Foreign Application Priority Data

Dec. 4, 2000 (SE) .................................. 0004465

(51) Int. Cl.
*B60T 7/16* (2006.01)
(52) U.S. Cl. .................. 180/167; 180/169; 700/245
(58) Field of Classification Search ................ 180/167, 180/168, 21, 169; 318/568.16, 587, 628, 318/568.12, 568.11; 701/28, 23; 250/253, 250/367, 559.33; 700/245, 247, 900
See application file for complete search history.

(56) References Cited

U.S. PATENT DOCUMENTS

| | | | |
|---|---|---|---|
| 4,698,775 A | 10/1987 | Koch et al. | |
| 4,736,826 A | 4/1988 | White et al. | |
| 4,887,223 A * | 12/1989 | Christian | 701/28 |
| 4,954,962 A * | 9/1990 | Evans et al. | 180/169 |
| 5,300,869 A | 4/1994 | Skaar et al. | |

(Continued)

FOREIGN PATENT DOCUMENTS

DE 4425924 1/1996

(Continued)

OTHER PUBLICATIONS

K. Ozaki et al., Synchronized Motion By Multiple Mobile Robots Using Communication, Proceedings of 1993 IEEE/RSJ International Conference on Intelligent Robots and Systems, Yokohama, Japan Jul. 26-30, 1993, pp. 1164-1170.

(Continued)

*Primary Examiner*—Hau Phan
(74) *Attorney, Agent, or Firm*—Venable LLP; Eric J. Franklin

(57) ABSTRACT

A mobile robot system for performing a plurality of separate operations, and including at least one autonomous wheeled mobile robot having at least one wheel-driving motor, an on-board computer, a system for navigation, orientation, and maneuvering in an environment with moving obstacles, a sensor system, a wireless communication system operative to receive and send signals, and a plurality of dockable operation modules and operative to be selectively coupled to the autonomous mobile robot to form an operation unit, wherein the autonomous wheeled mobile robot autonomously docks to the dockable operation modules.

22 Claims, 6 Drawing Sheets

U.S. PATENT DOCUMENTS

| | | | |
|---|---|---|---|
| 5,324,948 A | | 6/1994 | Dudar et al. |
| 5,525,882 A | * | 6/1996 | Asaka et al. ............ 318/568.16 |
| 5,787,545 A | * | 8/1998 | Colens ........................ 15/319 |
| 5,867,800 A | * | 2/1999 | Leif ............................ 701/23 |
| 5,936,240 A | * | 8/1999 | Dudar et al. ................. 250/253 |
| 6,338,013 B1 | * | 1/2002 | Ruffner ....................... 701/23 |
| 6,430,471 B1 | * | 8/2002 | Kintou et al. ............... 180/169 |
| 6,453,212 B1 | * | 9/2002 | Asama et al. ................. 701/23 |
| 6,459,955 B1 | * | 10/2002 | Bartsch et al. .............. 318/587 |
| 6,535,793 B1 | * | 3/2003 | Allard ........................ 318/628 |
| 6,651,763 B1 | * | 11/2003 | Kamen et al. ............. 180/171 |

FOREIGN PATENT DOCUMENTS

| | | |
|---|---|---|
| WO | 01/38945 | 5/2001 |

OTHER PUBLICATIONS

Tse Min Chen et al., Remote Supervisory Control of an Autonomous Mobile Robot Via World Wide Web, IEEE International Symposium Proceedings, Industrial Electronics, 1997, ISIE '97, pp. SS60-SS64.

Ryo Kurazume et al., Cooperative Positioning with Multiple Robots, IEEE International Conference on Proceedings, May 8-13, Robotics and Automation 1994, pp. 1250-1257.

* cited by examiner

ROBOT SYSTEM

TECHNICAL FIELD

The present invention relates to a robot system comprising a wheeled automatic robot and more particularly to a system including an autonomous robot having onboard data processing, sensor, guidance and communication means. More specifically, such a system comprises an autonomous robot, which per se is suitable for use in such a system. The invention also relates to a method of performing operations with the aid of an autonomous robot, a computer software product to carry out the method as well as a particular use of such a robot system. A robot in this context should mean a mobile robot and more precisely a wheeled mobile robot. The expression autonomous robot hereinafter means a robot that is self-governed such that the robot, on a given order, manages itself to find its way to a target location and carry out an ordered operation.

BACKGROUND OF THE INVENTION

Mobile robots have been known for quite some time both in the realm of science fiction and now in the real world. A first category of such robots are manually controlled. From a stationary location separated from the robot, it is controlled by wire or by wireless communication to carry out operations which are sometimes dangerous to man. A second category of these robots are automatically controlled. In a first aspect, these robots are arranged to automatically follow a track, which sometimes is invisible. Such a robot carries means for steering along a predefined track. In a second more sophisticated aspect of these mobile robots, they are equipped with an onboard computer by which they perform tasks of their own by a preprogrammed calculation.

Among the automatic robots there are specially two kinds: the track-finding robot and the border-finding robot, or combinations of the two. The track-finding robot carries means for finding a track, which in most cases is a buried wire that radiates a magnetic field. In yet another embodiment of this system, the track-finding means comprises a navigation system from which the robot finds out the predetermined track. The border-finding robot is typically an automatic lawn mower or an automatic vacuum cleaner. These robots sometimes carry a semi-autonomous system to find its paths and the location for battery recharging. They normally carry an onboard computer that is programmed to organize the planning of paths for efficient lawn mowing or vacuum cleaning. Thus, the only self-governing decisions to make is turning aside when an obstacle projects in front or if the robot has reached the border of the operation area. These robots are designed to perform one dedicated operation only and cannot be used for other operations. Although these robots are very costly to produce, they stay inactive most of the time. Thus, there is a need for a self-governed robot that performs a plurality of operations.

Automated guided vehicles (AGV), such as an automatic forklift, are commonly used for picking up and delivering goods or parts in a locality such as a warehouse or a factory. These vehicles are usually guided by floor loops or tracks. Vehicles of this kind are specially made for specific retrieving transporting and depositing tasks. A system including a plurality of such automated guided vehicles is often expensive. It has limited utility and is only feasible when a task is to be performed a huge number of times. It is, however, advantageous where manual performance is less reliable, extremely expensive or hazardous to humans. Due to the expense and difficulty of installing such systems, as well as safety and obstacle considerations, they have not found much widespread use outside the manufacturing industry.

In other areas, wheeled service robots have been afforded greater interest in recent years. One example is a camera and sensor equipped robot designed for security patrols. Others are designed to defuse explosives while still another is designed to be a tour guide. Robots of this kind are designed to be mail and goods couriers, hotel servants and also garbage collectors. Other robots are specially designed to perform tasks in dangerous radioactive environments. Each of these known robots is made for a specific operation or a limited number of closely related operations. Attempts have been made to combine a plurality of operation possibilities to one robot only. Such a robot must then at all times carry around equipment for performing different operations, yet only one piece of equipment is used at a time. This leads to heavy and clumsy robots that demand much power.

Through U.S. Pat. No. 5,324,948 an apparatus for performing radiological surveys is previously known. The object of the apparatus, which is an autonomous robot, is to eliminate the survey being performed by manual scanning. Thus, an autonomous robot is provided, which is directed by wireless transmission from a stationary host computer to perform a survey along a predefined path. On an operation command of going "from point a to point b", the program in the host computer sorts through its database of action files to find a path between the points. The host computer then downloads the most efficient path to the robot, which has an onboard computer. Once a path is downloaded, the robot acts autonomously until it reaches the end of the path. Typically the environment where the robot operated is made up of well-defined, unobstructed smooth surfaces.

The actual path planning is done by a host computer, not by the robot. To program the robot the operator first defines valid points in the area where the robot is to operate. Then the robot automatically finds its way along the path with the help of sensors mounted on the robot. Since the actions of the robot always are preprogrammed, the robot can not be regarded as being autonomous but merely automatic. There are no instances where the robot makes its own choice on where to go. All of its actions are programmed in advance.

The known robot is dedicated for one operation only. When not in use, the robot is resting at a docking station where it is recharged. Thus, an enormous amount of money is spent on a product which most of the time is resting and not given credit for. The performance is also very poor. The normal speed of the robot is about 9 meters per hour.

In an environment where the situation in which the robot must perform has moving people and objects in it, such as hospitals or the home, the robot must be able to make quick decisions to avoid collision with moving or temporary objects blocking its way. Not only must such a robot learn to navigate in a new environment, but must also quickly adapt to changes in the environment. These robots must also have special safety and avoidance mechanisms. An autonomous wheeled robot of this kind is previously known and designed to perform material transport operations in a hospital environment. In response to keyed-in commands, it transports pharmaceuticals, lab specimens, supplies, meals, medical records and radiology films. It has specific built-in compartments and trays for these tasks. This operation-dedicated robot has built-in sensors and a collision avoidance system to be able to perform in an environment with moving people and objects.

Providing a robot for general purposes having all of the above mentioned features will be very expensive due to development and maintenance costs for hardware and software. There are few individual applications outside of the manufacturing industry where these costs will not make the robot very expensive or will employ a robot which is used only occasionally. There are a great number of short duration tasks in the home, hospitals, laboratories and offices etc. where it would be desirable to have a robot, but where a separate operation-dedicated robot for each task would be unfeasible.

SUMMARY OF THE INVENTION

The object of the present invention is to find ways to develop a robot system of the kind discussed above and eliminate or at least reduce one or a plurality of the drawbacks mentioned by way of introduction, whereby particularly a greater flexibility of a robot system is aimed at.

This object is achieved by a mobile robot system comprising an autonomous mobile robot and a plurality of mobile operation modules. The autonomous robot carries an on-board computer and comprises means for navigation, environmental sensing and communication. An operation module is typically designed to perform one or a plurality of related predetermined operations, such as lifting, transporting, vacuum cleaning etceteras. The system is designed to combine the autonomous robot and an operation module to a movable unit where the robot navigates the unit and the operation module performs the desired operation at a predetermined location. In this constellation, the robot has the intelligence and the operating module has the power. The same intelligent robot is thus used to control each of the operation modules. When a first operation is completed the mobile unit returns to a docking station where the robot parks the first operation module and then docks with a second operation module to form a second operation unit. On an order from a central command unit the new operation unit makes its way to a second location to perform a second operation.

According to the invention, these objects are achieved by a robot system, an autonomous robot, as well as by a method.

The mobile robot system has a plurality of different interchangeable operation modules which are selectively and autonomously dockable to the autonomous mobile robot. Such a system of a single autonomous mobile robot and a plurality of operation modules makes it economically feasible to develop robot applications to fulfil a plurality of operations. The many different specialized robots (e.g. for floor polishing, vacuum cleaning, storing and retrieving, surveillance, lifting and general transport) all have certain functions in common, for example the wheels, suspension and drive motor, the sensor and navigation and guidance system, the on-board transceiver interface for user and computer interaction as well as the computer power to support these functions. These functions in common are included in the single autonomous mobile robot which could then couple itself as required to one of any number of task-dedicated operation modules. It is thus economically feasible to make a major investment in the design and development of such a robot system. This would be equipped with the latest state-of-the-art navigational, speech recognition, communication and decision-making hardware and software, since the same autonomous mobile robot could then be used for a plurality of different applications.

The autonomous mobile robot comprises an on-board computer, a plurality of sensors, a signaling interface a mechanical coupling interface and communication means.

The computer comprises a processor, memory means and a plurality of computer programs for controlling the robot. In the memory are stored digital maps of the present environment, navigation beacons and information of each and every operation module. The memory also carries ready to use strategies for navigation, orientation, maneuvering, communication as well as strategy for avoiding collisions. All information and programs are supplied by a network, such as a wireless local area network (LAN) or the Internet. The sensors comprise distance measuring means, such as an ultrasonic radar, sound measuring means, such as a microphone, and visual measurement system, such as a vision system including optics and an image sensor like an electronic device that is capable of transforming a light pattern (image) into an electric charge pattern, such as a Charge-Coupled-Device (CCD).

The signaling interface comprises protocols for sending and receiving signals, which carry information to and from sensors, operation modules and communication system. These signals are mainly sent on a local network which also comprises a wireless network. Thus the signal comprises a plurality of parts such as address, identity and messages.

The mechanical interface comprises a mechanical coupling to dock with the different operational modules. In a first embodiment, the mechanical interface comprises a gripping means on which the operation module is coupled. In an another embodiment, the mechanical interface comprises a hitch frame, which in one embodiment is rotatable around a axis normal to the longitudinal axis of the robot. In yet another embodiment, the hitch frame comprises a lowerable and raisable bar with one or a plurality of hooks.

The communication means comprises in a first embodiment a transmitter and a receiver for wireless communication. The communication medium is preferably electromagnetic waves but may also comprise sonic or a light communication medium.

The robot must be easily operated, without the need for complicated reprogramming. In a preferred embodiment, the robot is responding to spoken commands or commands sent via efficient communication means from a human or another computer or processor unit. In another preferred embodiment, they have extensive on-board computing capacity to be able to work autonomously, making their own decisions without requiring continual instructions and monitoring from an operator.

An autonomous robot of this type is quite sophisticated. Not only is it able to determine where it is, for example by means of an odometer and an accelerometer, calibrated to known fixed points in the environment, but it also has a sensor and monitoring system as well as a strategy for avoiding obstacles.

By introducing the robot system, resources are concentrated on the design and installation of an efficient power source, in most cases an on-board rechargeable battery pack. In a preferred embodiment, the autonomous robot decides on its own to go to a charging station when necessary and/or when not occupied by other tasks, and either charge its batteries or exchange battery packs leaving the spent pack at the station for recharging.

In a preferred embodiment such an autonomous robot, included in a system with a plurality of operation modules, is used almost continuously and thereby profitably in environments where individual task-dedicated autonomous robots, such as a floor polishing robots would not be profitable.

In a preferred embodiment, the operation module is provided with its own wheels. In this way they are storable and movable independently of the autonomous mobile robot and support their own loads. In another preferred embodiment, they are also provided with their own power means, for lifting etc. They also have means for electrical connection as well as means for signaling and interaction with the autonomous mobile robot. In this way, a docked operation module is capable of powering the autonomous robot.

An autonomous mobile robot normally has at least three wheels to be able to stand stable in an upright position. In a preferred embodiment, two of these wheels are used for driving and the third wheel is used for steering. In another preferred embodiment, the two wheels are moved separately and the third wheel is freely moveable in all direction in a horizontal plane. By rotating the two driving wheels at different speeds or in a remote direction, the robot is steered by those driving wheels. In this case the third wheel must be freely swivelable around a vertical axis. In another embodiment, the third wheel has both a driving and a steering function. In this case the two other wheels are used as tracking and stabilizing wheels. If more wheels are used, it would only result, especially when to ground is not flat, in one of the wheels being out of contact with the ground. If this wheel happens to be one of the driving wheels, the robot can not move correctly. This, of course, can be avoided by having suspended wheels. In another way this problem is avoided by having a horizontal axis functionality between the two pairs of wheels.

In a preferred embodiment of the invention, the robot comprises a cylinder shaped central body carried and is driven on two wheels or just one wheel. In this embodiment, the robot comprises a frame carrying the mechanical interface on a pair of wheels. The frame acts as a wagon to the central body and is attached to the central body by a coupling that allows the frame to swing around an axis parallel to the longitudinal axis through the central body.

According to the invention, the operation module has no wheels at all or any number of wheels. Most common would be two, three or four wheels. In any of these cases, the combined unit comprising an autonomous mobile robot and an operation module would have more than five wheels. According to the discussion above, this would result in an undefined contact with the ground. If one or more wheels are lifted or suspended on docking, this problem is solved. Then the combined unit would only have three wheels in firm contact with the ground. In one embodiment, the robot and the module are coupled with a coupling that allows rotation around an axis normal to a vertical connection plane between the robot and the module. In this way, four wheels are always in firm contact with the ground.

In yet another embodiment of the invention the robot has a coupling hatch by which the front end of an operational module is lifted such that only two or preferably no wheels are in firm contact with the ground. In an another preferred embodiment all, all but one or at least all but two wheels of the operation module are freely swivelable in all directions around an axis normal to the horizontal plane. In another preferred embodiment of a combined unit, one or two wheels of the operating module are in firm contact with the ground and thus act as tracking wheels. To accomplish this a pair of freely swivelable wheels on the mobile robot are locked in a longitudinal orientation for tracking when the autonomous mobile robot is uncoupled from an module. In another embodiment, this problem is solved by a raisable and lowerable tracking wheel of a fixed longitudinal orientation which is lowered for tracking when the autonomous mobile robot is not coupled to a wheeled module.

It is difficult to construct mathematical models for steering an autonomous mobile robot, which is coupled to a wheeled operation module, if the mathematical model must take into consideration the present orientation of the autonomous mobile robot in addition to the orientation of the wheeled operation module. This problem is dealt with by the axle construction. By making the coupling hitch frame pivotable relative to the driven wheel axle, the number and the complexity of the sensors on the autonomous mobile robot is decreased. The term "wheeled" in the claims is also intended to encompass wheeled robots having crawler or caterpillar tracks around the wheels.

An advantageous hitching means between the autonomous mobile robot and the selected operation module is defined whereby the coupling and decoupling is effected automatically without requiring that the center lines of the autonomous mobile robot and the operation module be in exact alignment before coupling.

The problem of automatically determining the length and orientation relative to the autonomous mobile robot of the operation module, and the presence or absence of obstacles beside the operation module is solved by the sensor constructions.

The present invention also encompasses a method of robotic performance of a plurality of tasks by means of the inventive mobile robot system incorporating at least one inventive autonomous mobile robot, whereby the robot receives a task command via the wireless communication interface and selects, approaches and couples itself with an appropriate operation module, performs a task and then decouples itself from said module. This is suitably performed using a computer program product, presented by any suitable medium, according to the invention for complete or partial processor-execution of the method.

BRIEF DESCRIPTION OF THE DRAWINGS

The advantages of the present invention will become more apparent when read with the specification and drawings, of which:

FIG. 1 is a schematic diagram representing the robot system according to the invention;

DETAILED DESCRIPTION OF EMBODIMENTS

The basic principle of the present invention is illustrated schematically in FIG. 1, which is based around a specially designed autonomous mobile robot or autonomous mobile robot.

This universal autonomous mobile robot is provided with sophisticated navigation, steering and orientation systems, possibly comprising on-board maps, compasses, gyros and/or a GPS. As was mentioned above, the problems of design work, logistics and costs which are solved by having a universal central autonomous mobile robot, which automatically docks at and couples itself to one of a plurality of operation modules. For ease of storage, manual movement, ease of coupling and even weight distribution on the autonomous mobile robot/module unit, these operation modules are preferably borne on their own wheels. Just a very few examples of different operation modules usable in a hospital environment are: a meal-tray storage and distribution module, a lab-test storage and transport module, an X-ray transport module, a clean laundry loading and distribution module, a dirty laundry receiving, transport and unloading module, a vacuum cleaning module, a floor polishing module, modules for the retrieval and delivery of all manner of supplies, and modules for the reception and disposal of all manner of used supplies and waste. The robot and system according to the present invention used for many different tasks will always have a task which it performs with one of its operation modules and thus is used around the clock, thereby increasing still further the cost-benefit of the robot system.

Figure 3A:
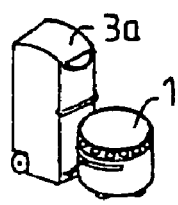
FIGS. 3(a–g) shows, in accordance with the present invention, an autonomous mobile robot coupled to seven different operation modules.
Figure 3B:
Figure 3C:
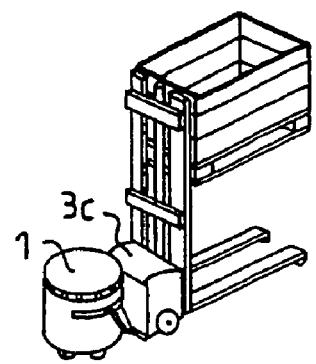
Figure 3D:
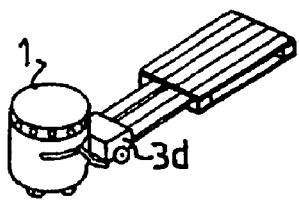
Figure 3E:
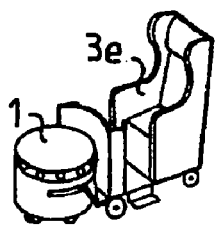
Figure 3F:
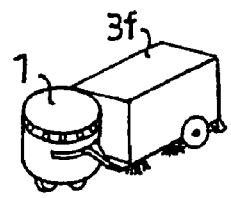
Figure 3G:
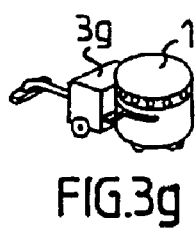

Almost all of these above-mentioned modules will of course also be immediately useful together with the autonomous mobile robot in many other indoor environments such as, offices, light industry, goods distribution, hotels, prisons, airports etc. The same autonomous mobile robot is shown FIGS. 3(a–g) coupled to various operation modules. FIG. 3a shows the autonomous mobile robot coupled to a tray transporter and storage compartment. Such an operation module will interact electronically with the autonomous mobile robot to receive instructions as to when to present which tray and to register delivery and/or reception. FIG. 3b shows the autonomous mobile robot coupled to a cart, which will be identified by the autonomous mobile robot by means of bar codes or by an electronic chip connection. The autonomous mobile robot may also lift the front wheels of the cart when hitching up to it in order to facilitate sharp steering to one side or the other. FIG. 3c shows the autonomous mobile robot coupled to a forklift operation module which has its own power means enabling it to interact with the autonomous mobile robot and perform lifting functions and FIG. 3d shows the autonomous mobile robot coupled to a pallet truck operation module. FIG. 3e shows the autonomous mobile robot coupled to a chair for people transport in an airport for example. FIG. 3f shows the autonomous mobile robot coupled to a floor sweeper and/or polisher module and FIG. 3g shows the autonomous mobile robot coupled to a vacuum cleaner module.

These above-mentioned examples are just very few of the many ways in which the system according to the invention is readily adaptable to new tasks by providing a new module but still using the same autonomous mobile robot, in which there are concentrated the functions of traction, navigation, steering, transceiving, safety sensing etc., functions which are difficult, time-consuming and expensive to design into a robot. The robot system according to the invention becomes economically feasible in environments of smaller size than the size required to make a task-dedicated robot, which requires a very large hospital unit for economic feasibility. The robot system according to the invention makes it possible to perform many more tasks than was previously possible. Its universal nature makes it also possible to use a number of identical robots in the same system.

Figure 2A:
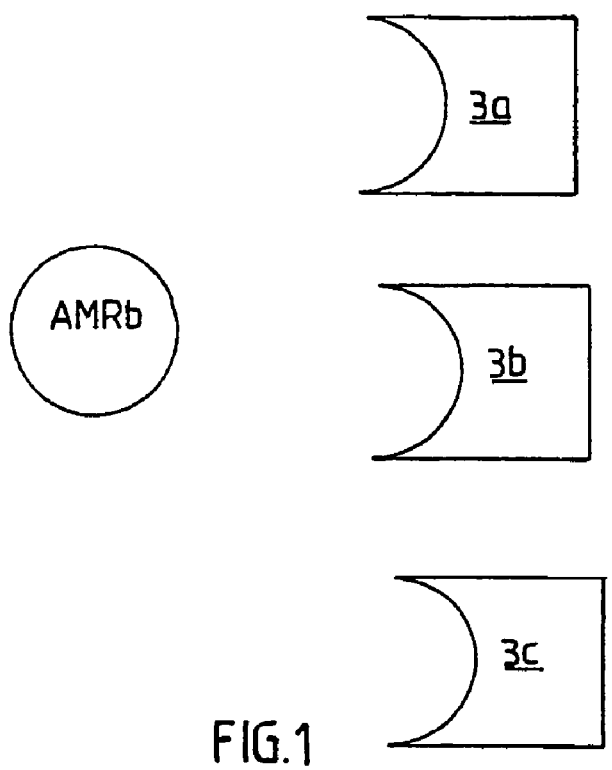
FIG. 2 shows in perspective a first embodiment of the autonomous mobile robot included in the invention, in an extreme cut-away view (2a) and in a view only slightly cut away (2b)
Figure 2B:
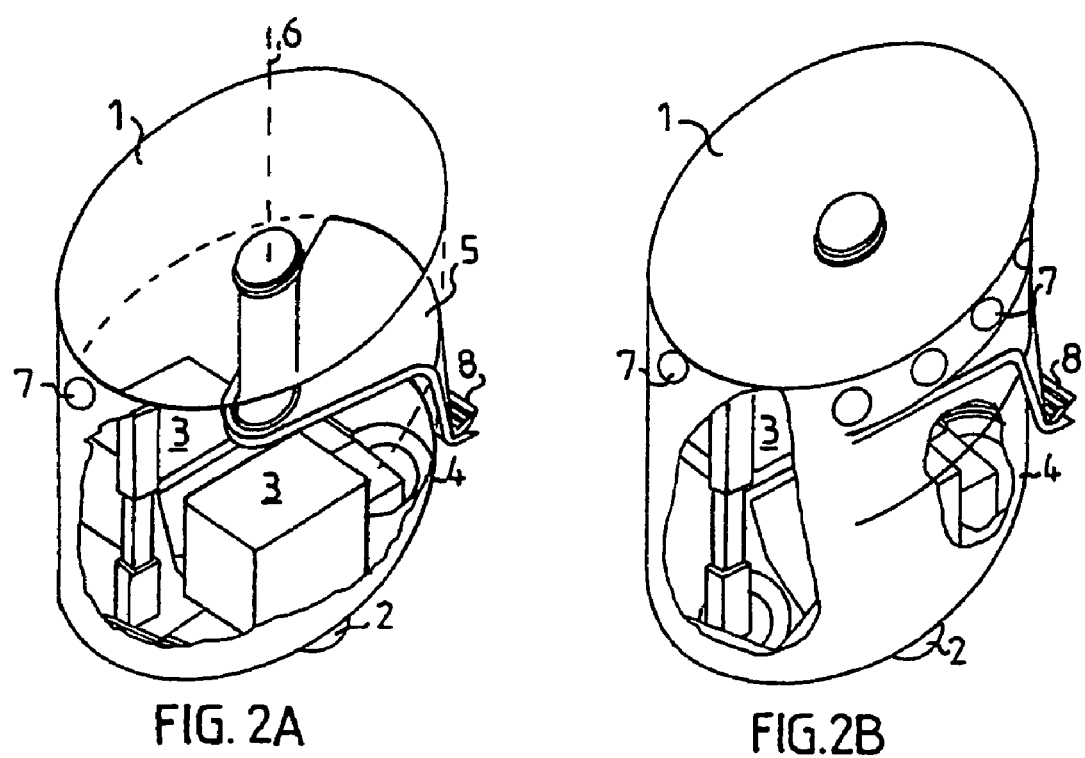

A first embodiment of an automated guided vehicle or autonomous mobile robot for use in the system according to the invention is shown in FIGS. 2(a and b) of which the cutaway view in FIG. 2a reveals more of the inside of the autonomous mobile robot than does FIG. 2b. An elliptical or circular cylindrical body 1 contains the central components of the autonomous mobile robot which include an on-board central processing unit, and a guidance system which may include ultrasonic sensors. The autonomous mobile robot is provided with a driving and steering wheel 2 at the front, as well as a pair of non-driven wheels 3 and a freely swivelable support wheel 4 at the rear end. The autonomous mobile robot is also provided with a coupling hitch 5 for coupling to a chosen operation module. In this particular embodiment, the hitch is coupled to the operation module by backing towards the selected operation module with a hook bar 8 in its lowered position, and raising the hook bar 8 when the autonomous mobile robot senses that it has come into coupling position with a coupling bar mounted on the operation module. The front wheels of some of the operation modules will be raised above the floor in some cases to avoid steering problems. This will complete the automatic coupling.

The module is identified by various means, for example a bar code on each module.

Communication between the autonomous mobile robot and the module is effected in several different ways, which are known per se. Direct electrical contact can, of course, be established between the module and the autonomous mobile robot via the hook bar 8 and the coupling bar on the module, but infrared or so-called "Bluetooth" short range radio transceivers can also be used. It is also envisioned that wireless technology may also be used for communication between the user or a central computer system and the autonomous mobile robot.

Figure 4A:
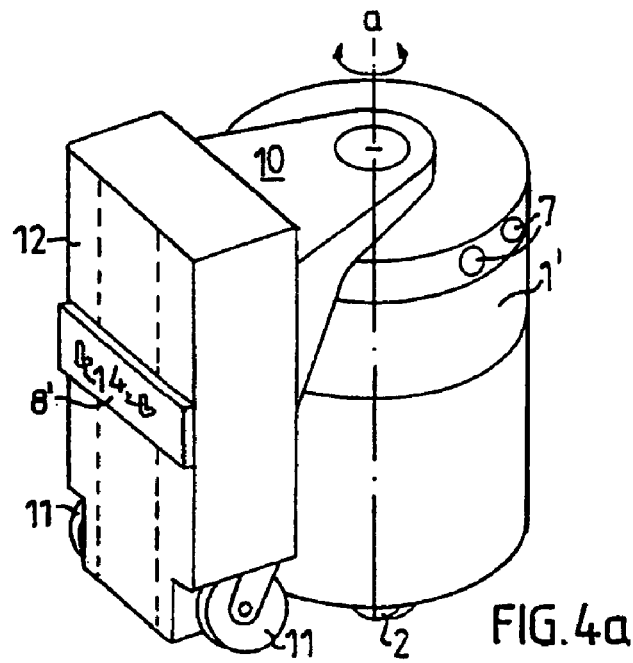
FIGS. 4a and 4b show in perspective and from above another suitable articulated autonomous mobile robot in the system according to the invention.
Figure 4B:
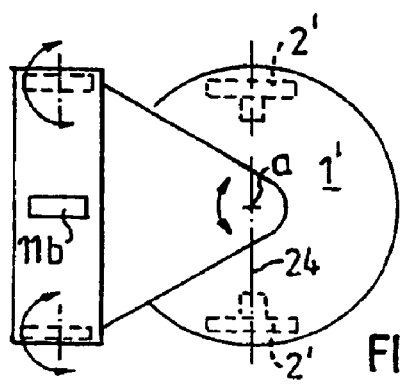

Other versions of the autonomous mobile robot used in the system according to the invention are shown in FIGS. 4a & b where FIG. 4a shows a perspective view and FIG. 4b shows a view from above of this embodiment which has two differentially driven wheels. In the embodiment in FIG. 4, parts corresponding to those in the embodiment of FIG. 2 have been given the same reference numerals. In this case the body 1 is completely circular.

As shown in FIG. 4b, the body 1 together with two axle mounted drive wheels 2 is rotatable as a unit relative to a frame 10 which is borne on its own non-driven swivel mounted wheels 11 on which there is mounted a vertical hitching frame 12 with a raisable and lowerable hook bar 8. The wheel axle of the drive wheels 2 has its midpoint on the vertical center axis of the body and in order to steer in a certain desired direction, the body 1, axle and wheels 2 need only rotate as a unit relative to the frame 10 and then move forward in that direction. The rotation is effected by driving the wheels in opposite directions. This arrangement makes it easier to calculate the steering of the autonomous mobile robot/module unit than in the embodiment discussed above.

Since the operation modules are provided with wheels, the non-driven supporting wheels of the autonomous mobile robot, when it is coupled to an operation module, will slide laterally during turning, subjecting their axle(s) to excessive bending moment if they are not freely swivelable. But if they are freely swivelable, the mobile robot, when not coupled to an operation module will not track and its steering will be ambiguous making it impossible for the robot to calculate its steering path. Therefore, the wheels 11 on the frame 10 are made to be lockable by the mobile robot in a longitudinal orientation, i.e. perpendicular to the hook bar 8, for tracking when the autonomous mobile robot is uncoupled from an operation module.

In an another embodiment, this problem is solved by a raisable and lowerable tracking wheel 11b (FIG. 4b) of a fixed longitudinal orientation, which is lowered for tracking when the autonomous mobile robot is not coupled to a wheeled operation. If provided with the raisable and lowerable tracking wheel, the other wheels 2 can remain freely pivotable.

The coupling hitch 12 is pivotally mounted about the central vertical axis a of the autonomous mobile robot, which also passes through the midpoint of the axle carrying the driving wheels 2, which are fixed in this embodiment. This method of pivotally mounting the hitch in the autonomous mobile robot increases the ease with which the autonomous mobile robot is steered when coupled to a module. The steering computer needs to be less concerned with the orientation of the autonomous mobile robot itself when calculating how to navigate with the operation module along a certain desired path. The robot thus moves freely in any direction without having to consider the orientation and placement of the robot. An automobile, for example must be moved forward or backward to change its orientation. This feature makes the mathematical calculation by the autonomous mobile robot of the path to be taken much simpler since consideration must only be taken of the orientation and position of the operation module, which is monitored by sensor means which are described in more detail below.

Figure 5A:
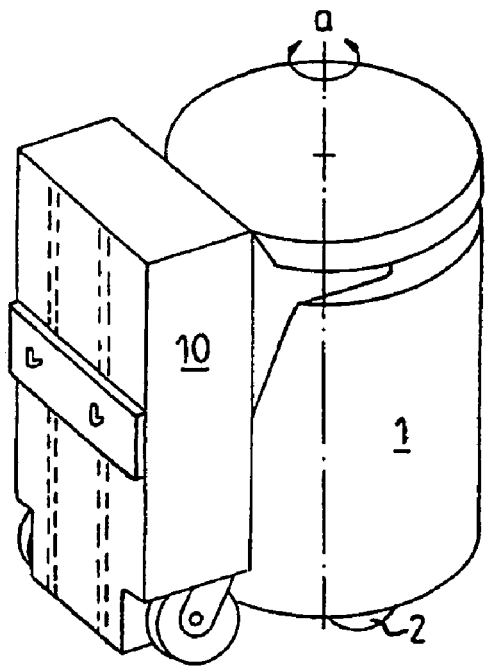
FIGS. 5a and 5b show two different articulated autonomous mobile robots to be used in the system according to the invention.
Figure 5B:
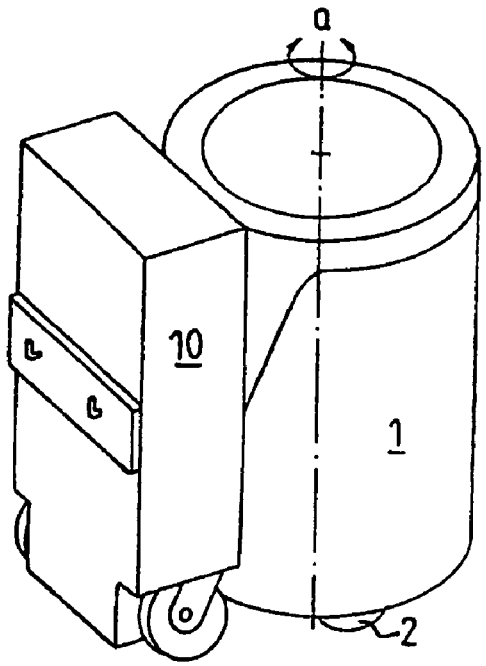

FIGS. 5a and 5b show two alternative designs for an articulated autonomous mobile robot where the frame 10 and the body 1 are articulated relative to each other, preferably with means for forcibly swinging the frame 10 relative to the body 1 and for locking them at a certain angle relative to each other if this should prove necessary or desirable.

Figure 6A:
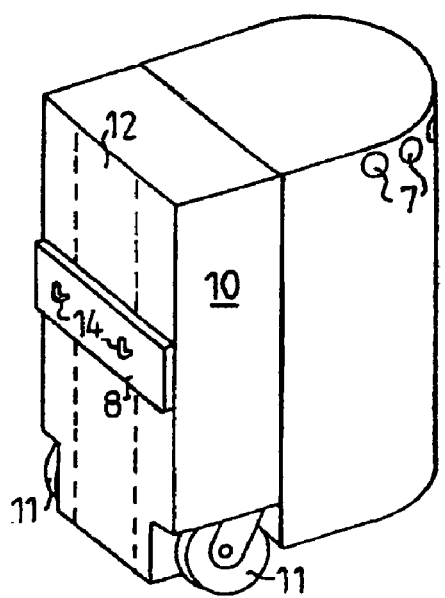
FIGS. 6a and 6b show in perspective and from above a non-articulated autonomous mobile robot suitable for use in the system according to the invention.
Figure 6B:
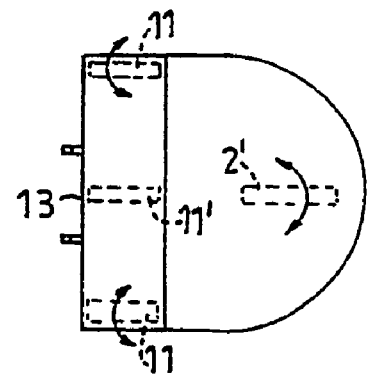

FIGS. 6a and 6b show still another version of an autonomous mobile robot to be used in the system according to the invention, wherein FIGS. 6a and 6b show a three-wheeled autonomous mobile robot in perspective and from above, respectively. Parts corresponding to those in the embodiments shown in FIGS. 2, 4 and 5 have been given the same reference numerals. In this embodiment of the three-wheeled autonomous mobile robot, the hitching frame 12 is not articulated to the body as in the embodiment shown in FIG. 4. Rather it is rigidly fixed to the autonomous mobile robot body. A hook bar 8 provided with two hooks 14 is raisable by means of a built-in pulley mechanism to couple the autonomous mobile robot to hook receiving means on the selected operation module. It is possible for the hook bar 8 to lift front wheels on the operation module off the floor to facilitate maneuvering. In this case, the autonomous mobile robot is driven and steered by a single wheel and is also provided with ultrasonic sensors 7. For movement alone, the hitching frame is provided in this embodiment with a raisable and lowerable tracking wheel 11' since the steering would otherwise be ambiguous with the two swivel wheels 11.

Figure 7:
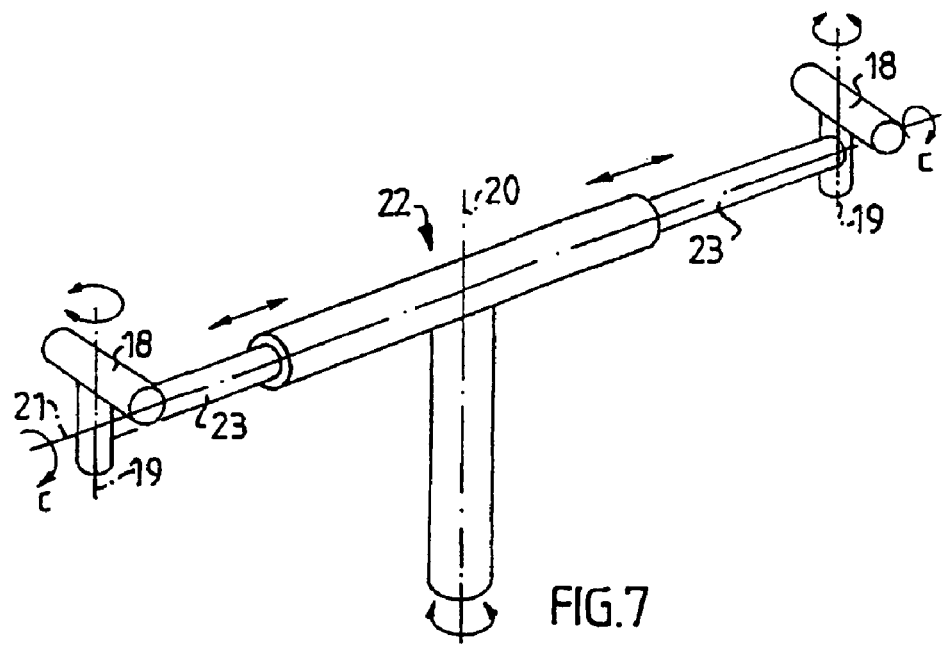
FIG. 7 shows a telescoping sensor arrangement for mounting on the autonomous mobile robot.
Figures 8A, 8B:
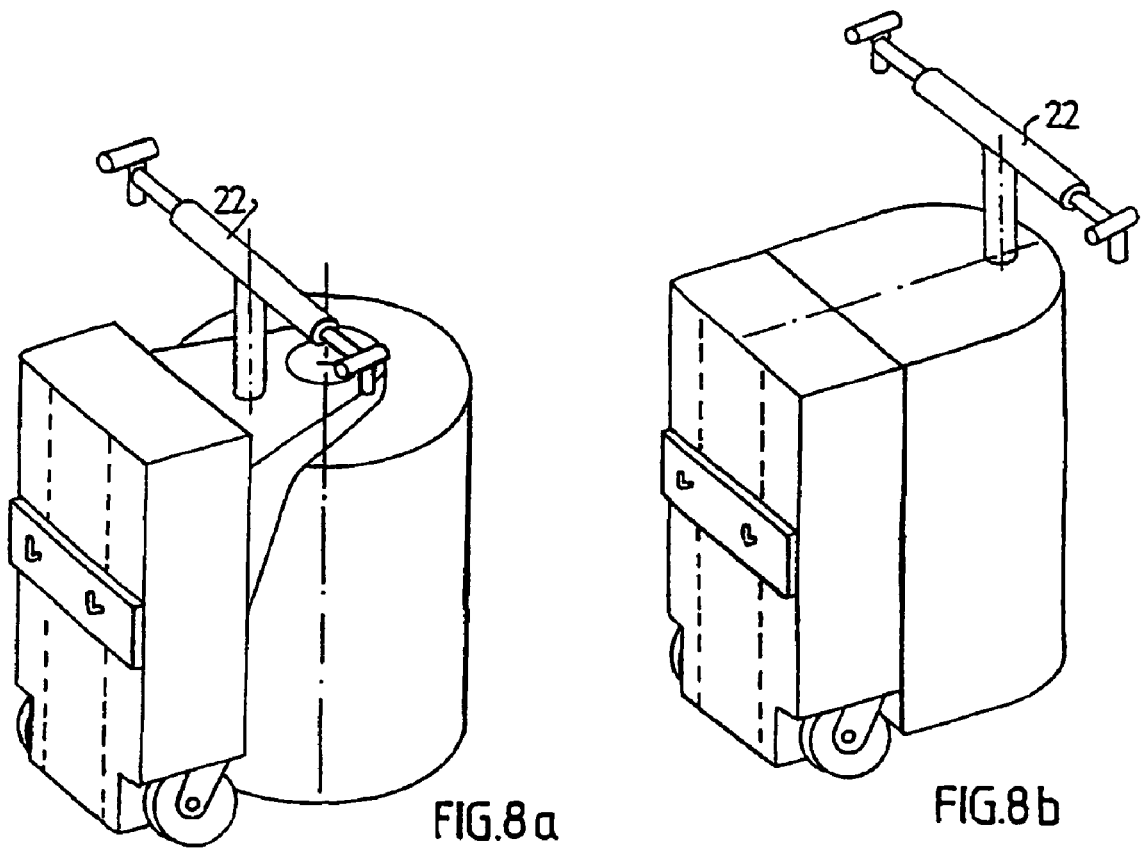
FIGS. 8a and 8b show such a sensor arrangement mounted on the autonomous mobile robot of FIGS. 4a and 6a, respectively.

FIG. 7 shows one form of a telescoping sensor arrangement 22 used for monitoring the operation module and its relation to the surroundings. It is shown in FIG. 8a mounted on the autonomous mobile robot of FIG. 4a and in FIG. 8b mounted on the autonomous mobile robot of FIG. 6a. Two sensors 18, which in this particular case are infrared distance measuring sensors, are directed rearwardly on either side of the coupled operation module. The sensors are sweepable over a desired sector by each being rotatable about a vertical axis 19 and a laterally directed horizontal axis 21. For correct positioning of the sensors in relation to the sides of the operation module, they are mounted on telescoping arms and the entire arrangement is rotationally adjustable about a vertical axis 20. All these above described movements of the sensors are servo-controlled by the robot.

Figure 9A:
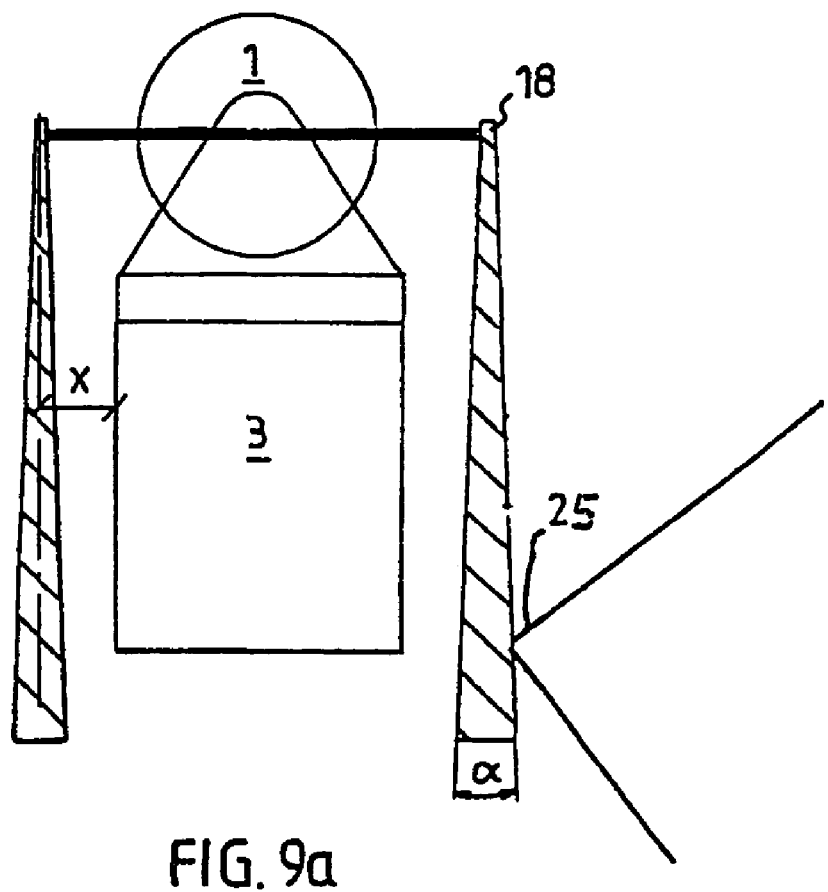
FIGS. 9a and 9b illustrate the scanning pattern of an infrared sensor arrangement.
Figure 9B:
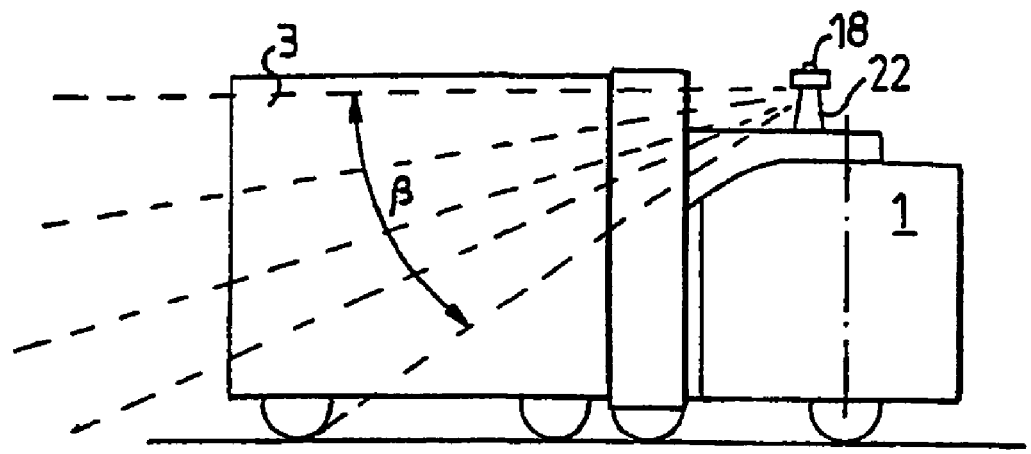

With reference to FIGS. 9a and 9b, an unspecified operation module is coupled to an autonomous mobile robot 1 of the type shown in FIGS. 4a, 4b and 7a. The infrared sensors 18 are extended by the arms 23 (see FIG. 7) to outside either side of the coupled operation module 3 and are directed backwards. Each sensor 18 spans a horizontal angular sector $\alpha$ and sweeps up and down over a vertical angular sector $\beta$. An object (in this case a corner) 25 is detected to one side of the operation module and the distance and direction thereto is registered by the autonomous mobile robot. The robot knows the dimensions (length, width, height, wheel placement and steering characteristics of the operation module), and then calculates how it must steer to reach its goal and at the same time avoid such obstacles as the corner 25. It will also continually monitor any obstacles and prompt a correction of the current calculated steering path should it become evident that it will not provide the desired obstacle avoidance. This sensor arrangement is also used to locate an operation module before coupling and for directing the autonomous mobile robot for coupling thereto. It is also used for backing the autonomous mobile robot with the operation module for parking thereof.

Figure 10:
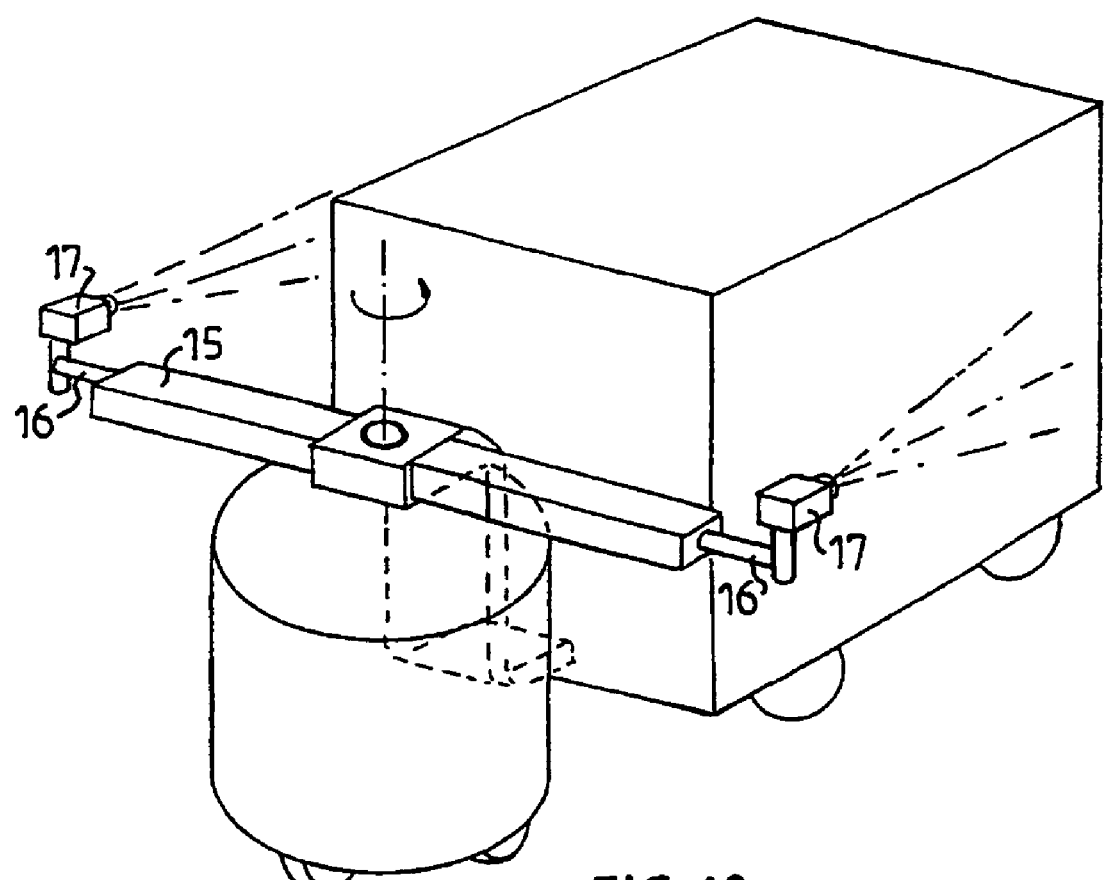
FIG. 10 schematically shows an autonomous mobile robot unit equipped, as an alternative, with a transverse boom with cameras for collision avoidance when taking corners.

FIG. 10 shows an alternative means for surveillance along the sides of the autonomous mobile robot/module unit using a pair of cameras 17 instead of infrared sensors. It is intended to enable the unit to avoid collisions with walls and any objects which may come near one of the sides of the module. A boom 15 is permanently fixed transverse to the coupling hitch 5 in such a way that it is always parallel to the end wall of the module to which the autonomous mobile robot is coupled. On either side cameras 17 are mounted on brackets 16, which may be telescoping to adapt to different modules. When hitching up to the module, each camera can "see" the rear edge of the module and the processor of the autonomous mobile robot adjusts each camera to aim at the rear edge of the module, keeping the rear edge at a certain position in its field of view. When an object such as a wall, a cart, a person or other obstacle comes into the view of either camera, the software in the processor in the autonomous mobile robot calculates if there will occur a collision with that object if the steering angle of the steered wheel or wheels is kept the same, and adjusts it accordingly.

What is claimed is:

1. A mobile robot system for performing a plurality of separate operations, the robot system comprising:
    at least one autonomous wheeled mobile robot having at least one wheel-driving motor and comprising a coupling hitch frame, the coupling hitch frame comprising a horizontal bar including at least two upwardly directed hooks;
    an on-board computer;
    means for navigation, orientation, and maneuvering in an environment with moving obstacles;
    a sensor system;
    a wireless communication system operative to receive and send signals; and a plurality of dockable operation modules and operative to be selectively coupled to the autonomous mobile robot to form an operation unit, wherein the autonomous wheeled mobile robot autonomously docks to the dockable operation modules, the bar being automatically lowerable to disengage from and automatically raisable to engage receiving means on each operation module.

2. The mobile robot system according to claim 1, wherein the operation modules comprise wheels.

3. The mobile robot system according to claim 1, wherein the operation modules are self-supporting.

4. The mobile robot system according to claim 1, further comprising:
electrical and signaling connection between the autonomous mobile robot and the operation modules.

5. The mobile robot system according to claim 1, wherein at least one of the operation modules comprises its own power means.

6. The mobile robot system according to claim 1, wherein the autonomous mobile robot comprises a pair of freely swivelable wheels that are selectively lockable in longitudinal orientation when the autonomous mobile robot is not coupled to an operation module.

7. The mobile robot system according to claim 1, wherein the autonomous mobile robot comprises a raisable and lowerable longitudinally oriented tracking wheel that is lowerable to floor contact when the autonomous mobile robot is not coupled to an operation module.

8. The mobile robot system according to claim 1, wherein the at least one driven wheel of the autonomous mobile robot is mounted on an axle that is pivotally mounted about a vertical axis passing through the midpoint of the axle.

9. The mobile robot system according to claim 8, wherein the coupling hitch frame is swivelable around an axis parallel to a longitudinal axis of the autonomous mobile robot.

10. The mobile robot system according to claim 1, wherein the autonomous mobile robot comprises at least a pair of rearwardly directed sensors, laterally mounted on either side of the autonomous mobile robot or its coupling hitch, whereby the orientation, length and position of an operation module and surrounding obstacles are sensed and processed by the on-board central processing unit.

11. The mobile robot system according to claim 10, wherein the rearwardly directed sensors are laterally telescopically mounted to be extended beyond the width of the operation module which is coupled to the autonomous mobile robot.

12. The mobile robot system according to claim 10, wherein the rearwardly directed sensors are ultrasonic sensors.

13. The mobile robot system according to claim 1, wherein the system includes a plurality of coordinated wheeled autonomous mobile robots.

14. An autonomous robot, comprising:
at least one wheel-driving motor;
at least one wheel driven by the motor;
an on-board computer;
means for navigation, orientation, and maneuvering in an environment with moving obstacles;
a sensor system;
a wireless communication system for receiving and sending signals; and
a coupling hitch frame for autonomous selective mechanical and/or electrical coupling to and uncoupling from one of a plurality of different interchangeable wheeled operation modules, wherein the coupling hitch frame comprises a horizontal bar including at least two upwardly directed hooks, the bar being automatically lowerable to disengage from, and automatically raisable to engage receiving means on each operation module.

15. The autonomous robot according to claim 14, wherein the autonomous robot comprises a pair of non-driven, freely swivelable wheels that are selectively lockable in a longitudinal orientation when the autonomous mobile robot is not coupled to an operation module.

16. The autonomous robot according to claim 14, wherein the autonomous mobile robot comprises a non-driven raisable and lowerable longitudinally oriented tracking wheel that is lowerable to floor contact when the autonomous mobile robot is not coupled to an operation module.

17. The autonomous robot according to claim 14, wherein the at least one driven wheel of the autonomous mobile robot is mounted on an axle that is pivotally mounted about a vertical axis passing through the midpoint of the axle.

18. The autonomous robot according to 17, wherein the coupling hitch frame is pivoted about said vertical axis.

19. The autonomous robot according to claim 14, further comprising:
at least two rearwardly directed sensors, laterally mounted on either side of the autonomous mobile robot or its coupling hitch frame, whereby the orientation, length and position of an operation module and surrounding obstacles can be sensed and processed by the on-board central processing unit.

20. The autonomous robot according to claim 19, wherein the rearwardly directed sensors are laterally telescopically mounted to be extended beyond the width of the operation module that is coupled to the autonomous mobile robot.

21. The autonomous mobile robot according to claim 19, wherein the rearwardly directed sensors are ultrasonic sensors.

22. A method for performing a plurality of separate operations with a mobile robot system comprising at least one autonomous wheeled mobile robot having at least one wheel-driving motor; an on-board computer; means for navigation, orientation, and maneuvering in an environment with moving obstacles; a sensor system; a wireless communication system for receiving and sending signals; and a coupling hitch frame, the coupling hitch frame comprising a horizontal bar including at least two upwardly directed hooks, the method comprising:
selecting an operation module in a docking station for a predetermined operation;
the robot autonomously docks with the operation module, makes electrical and signaling connection with the operation module, and forms an operation unit, wherein the docking comprises engaging the operation module with the coupling hitch;
the operation unit transports itself to an ordered location by the intelligence of the robot;
the operation is autonomously carried out by the operation module at the location; and
the operation unit autonomously returns to the docking station where the robot and the operating module are autonomously undocked and disengaged from the coupling hitch, the bar being automatically lowerable to disengage from and automatically raisable to engage receiving means on each operation module.

* * * * *